(12) United States Patent
Oyama

(10) Patent No.: US 7,977,837 B2
(45) Date of Patent: Jul. 12, 2011

(54) ROTARY BODY USED FOR ENERGY STORAGE APPARATUS, METHOD OF MANUFACTURING ROTARY BODY, AND ENERGY STORAGE APPARATUS

(75) Inventor: Terutsugu Oyama, Sanuki (JP)

(73) Assignee: Six One Kaihatsukikou Co., Ltd., Kagawa (JP)

(*) Notice: Subject to any disclaimer, the term of this patent is extended or adjusted under 35 U.S.C. 154(b) by 564 days.

(21) Appl. No.: 11/574,689

(22) PCT Filed: Sep. 5, 2005

(86) PCT No.: PCT/JP2005/016278
§ 371 (c)(1),
(2), (4) Date: May 7, 2007

(87) PCT Pub. No.: WO2006/028065
PCT Pub. Date: Mar. 16, 2006

(65) Prior Publication Data
US 2008/0032894 A1    Feb. 7, 2008

(30) Foreign Application Priority Data

Sep. 6, 2004  (JP) .................................. 2004-293113

(51) Int. Cl.
H02K 7/02 (2006.01)
H02K 7/09 (2006.01)
(52) U.S. Cl. ..... 310/90.5; 310/114; 310/118; 310/216.137; 310/261.1; 74/572.11; 74/572.21; 29/598
(58) Field of Classification Search .............. 310/74, 310/90.5, 153, 126.31, 156.31, 216.113, 310/216.137, 261.1, 271; 74/572.1, 572.11, 572.21; 29/596, 598
See application file for complete search history.

(56) References Cited

U.S. PATENT DOCUMENTS

| | | | | | |
|---|---|---|---|---|---|
| 5,245,270 | A | * | 9/1993 | Akiyama | 322/4 |
| 5,929,548 | A | * | 7/1999 | Pinkerton et al. | 310/166 |
| 6,040,644 | A | * | 3/2000 | Schuster | 310/43 |
| 2008/0032894 | A1 | * | 2/2008 | Oyama | 505/166 |

FOREIGN PATENT DOCUMENTS

| | | |
|---|---|---|
| JP | 55-063035 | 5/1980 |
| JP | 04-135721 | 5/1992 |
| JP | 06-233479 | 8/1994 |

(Continued)

Primary Examiner — Quyen Leung
Assistant Examiner — David W. Scheuermann
(74) Attorney, Agent, or Firm — Leason Ellis LLP

(57) ABSTRACT

A rotary body used in an energy storage device and capable of storing a large amount of external energy is provided in an energy storage device that stores external energy as the energy of the rotary motion of the rotary body for which the frictional resistance of the bearing parts has been reduced to a high degree using the fishing effect of superconductivity. The rotary body is used in an energy storage device capable of storing energy by rotating the rotary body for which the frictional resistance of the bearing parts having floating support that makes use of the fishing effect of superconductivity has been made very small. The rotary body is made of CFRP, and the required compressive stress is applied to it in the direction opposite to the centrifugal force of the rotary body when rotating. The rotary body has a bar-like structure elongated in the direction of the centrifugal force when the rotary body rotates.

3 Claims, 2 Drawing Sheets

FOREIGN PATENT DOCUMENTS

| | | |
|---|---|---|
| JP | 8-14249 A | 1/1996 |
| JP | 8-200470 | 8/1996 |
| JP | 10-092627 | 4/1998 |
| JP | 2992578 | 10/1999 |
| JP | 11-337240 | 12/1999 |
| JP | 2000-158476 | 6/2000 |
| JP | 2002-95208 A | 3/2002 |

* cited by examiner

ROTARY BODY USED FOR ENERGY STORAGE APPARATUS, METHOD OF MANUFACTURING ROTARY BODY, AND ENERGY STORAGE APPARATUS

CROSS REFERENCE TO PRIOR APPLICATIONS

This is a U.S. national phase application under 35 U.S.C. §371 of International Patent Application No. PCT/JP2005/016278 filed Sep. 5, 2005, and claims the benefit of Japanese Application No. 2004-293113 filed Sep. 6, 2004. The International Application was published on Mar. 16, 2006 as International Publication No. WO 2006/028065 under PCT Article 21(2), the content of which is incorporated herein in its entirety.

TECHNICAL FIELD

The present invention relates to a rotary body used in an energy storage device, a manufacturing method for a rotary body and an energy storage device. More specifically the present invention relates to a rotary body used in an energy storage device, a manufacturing method for a rotary body and an energy storage device where high speed rotation unavailable conventionally is made possible by improving the deformation resistance in the rotary body used in an energy storage device and making it possible to store a larger amount of external energy in an energy storage device that stores external energy as the energy of the rotary motion of the rotary body for which the frictional resistance of the bearing parts has been reduced to a high degree using the fishing effect of superconductivity.

BACKGROUND ART

Conventionally, attempts have been made to use surplus electric power and the like to rotate a flywheel supported by bearings and store the energy as the energy of the rotary motion of the flywheel. To do so, the rotational resistance of the flywheel is reduced as much as possible, and essentially, it is rotated in a resistance-free state.

In actual fact, a flywheel that is given floating support using the fishing effect (pinning effect) of superconductors that can restrict and hold lines of magnetic force that penetrate internally and reduces the frictional resistance of the bearing part to an extreme degree is used.

An example is disclosed in Japanese Patent No. 2992578, wherein the flywheel described is formed in the shape of a disk or the shape of a ring.

However, conventional disk-shaped or ring-shaped flywheels give rise to the following problems.

In other words, it is theoretically possible to increase the amount of energy stored by producing the flywheel from a material that is comparatively light in weight with high tensile strength, for example, carbon fiber reinforced plastic (CFRP) or the like, and rotating the flywheel at an even higher speed.

CFRPs are carbon fiber reinforced plastic thermosetting resins that use carbon fibers in a manner similar to glass fiber reinforced plastics (GFRP), which have continuous fibers, woven fabric, short fibers and the like for glass fibers hardened by a thermosetting resin, such as unsaturated polyester resin or epoxy resin.

In addition, when the tensile strength of CFRP materials is calculated, it is possible that the speed at the periphery of a flywheel increases to approximately 1800 m/sec.

However, when the periphery of the flywheel reaches a speed of approximately 800 m/sec with disk shaped or ring shaped flywheels, strain and deformation arise in the flywheel itself because of the centrifugal force from the rotation; therefore, the rotational balance of the flywheel breaks down, shaft vibration increases, and the rotational speed cannot be increased above that.

Therefore, it is technically difficult to increase the speed of rotation so that the speed at the periphery of the flywheel is greater than approximately 800 m/sec.

SUMMARY OF THE INVENTION

It is an object of the present invention to provide a rotary body used in an energy storage device, a manufacturing method for a rotary body and an energy storage device where high speed rotation unavailable conventionally is made possible by improving the deformation resistance in the rotary body used in an energy storage device and capable of storing a larger amount of external energy in an energy storage device that stores external energy as the energy of the rotary motion of the rotary body for which the frictional resistance of the bearing parts has been reduced to a high degree using the fishing effect of superconductivity.

An aspect of the invention is a rotary body used as a flywheel in an energy storage device and is a rotary body wherein a required compressive force or compressive stress is applied in advance to the rotary body in the direction opposite to the direction of centrifugal force when the rotary body is rotating.

Another aspect of the invention is a rotary body used in an energy storage device capable of storing energy by rotating a rotary body for which the frictional resistance of the bearing part, which is given floating support using the fishing effect of superconductors, has been made very small, and the rotary body is a rotary body used in an energy storage device wherein a required compressive force or compressive stress is applied in advance to the rotary body in the direction opposite to the direction of centrifugal force when the rotary body is rotating.

A further aspect of the invention is the rotary body used in an energy storage device according to the above aspects of the invention, wherein the rotary body has a structure elongated in the direction of the centrifugal force when the rotary body rotates.

Another aspect of the invention is an energy storage device wherein there is provided the rotary body according to the above aspects of the invention, which is rotatably given a floating support with a low frictional resistance using the fishing effect of superconductors, a vacuum tank capable of accommodating this rotary body and maintaining the inside at a high vacuum state, an input means for external energy to be stored as the energy of the rotary motion that provides external energy to the rotary body and rotates it, and an output device capable of extracting the energy of rotary motion of the rotary body to the outside.

A further aspect of the invention is an energy storage device wherein there are provided an insulated vessel disposed so as to accommodate a superconductor that is able to restrict and hold lines of magnetic force that penetrate internally and generate the fishing effect, a cooling device that cools a coolant for maintaining the inside of the insulated vessel at a critical temperature for the superconductor or lower, the rotary body according to the other aspects of the invention having a magnet that generates the fishing effect along with the superconductor, a vacuum tank that along with accommodating the insulated vessel, accommodates the rotary body such that it rotates freely and is capable of maintaining a high vacuum state inside using a pressure reducing device, and an input/output device capable of providing a rotary force using external energy to the rotary body in the vacuum tank, giving the rotary body rotary motion in a low frictional resistance state and storing the external energy as that energy of rotary motion as well as extracting that energy of rotary motion to the outside.

Another aspect of the invention is the energy storage device according to the above aspects of the invention, wherein the rotary body is a plurality stacked in the direction of the line of the axis of rotation.

A further aspect of the invention is a manufacturing method for a rotary body used in an energy storage device wherein a linear body or a ribbon-like body made of carbon fiber, glass fiber or high tensile strength fiber is wrapped around pulling elements, the required tensile force applied in the direction of centrifugal force when the rotary body is rotated on the linear body or ribbon-like body by the pulling elements and a skeletal body formed. With the tensile force applied, plastic is hardened in a required shape so as to contain the skeletal body, and the tensile force of the pulling elements is released.

The tensile force applied to the skeletal body is, for example, the limit value for failure bearing strength of a ring-shaped body, but it is not limited to this and may be set suitably.

There are no particular limitations for the superconductors, but, for example, a high-temperature oxide superconductor is used.

The magnet provided for the rotary body may be subdivided into small portions in the direction of the radius of the rotary body for which the magnet is provided in order to increase the magnetic gradient of the magnetic field formed by the magnet.

The magnets may be magnets having a concentric distribution of the lines of magnetic force, and permanent magnets may be used as the material therefor.

The superconductors may be formed with radii that differ from each other and may be disposed between the various magnets formed in a plurality of layers with radii that differ from each other.

Liquid nitrogen, for example, may be used for the coolant, but it is not limited to this. At or below the boiling point of liquid nitrogen, high-temperature oxide superconductors and the like may be brought below the critical temperature of the superconductor.

In addition, liquid helium may be used as the coolant. At or below the boiling point of liquid helium, high-temperature oxide superconductors and the like may also be brought below the critical temperature of the superconductor.

The work or operation of the rotary body and energy storage device according to the present invention will be described.

Since the rotary body has the required compressive force or compressive stress applied in advance in the direction opposite to the direction of centrifugal force when the rotary body is rotating, the strain caused by the compressive force or compressive stress when it is rotated and centrifugal force arises is reduced, equalized or eliminated, and it is difficult for the rotary balance of the rotary body to be broken down even with rotation at high speeds conventionally unavailable, and it is also difficult for the shaft vibration to increase.

Therefore, the angular speed of rotation may be increased to the limits of the strength of materials, for example CFRP or the like, that is, to the limits of the tensile strength, essentially without giving rise to strain or deformation of the rotary body. Operation not being possible because the vibration of the rotary shaft increases with an increase in the angular speed of rotation because of a breakdown in the rotary balance of the rotary body may be prevented.

Specifically, even if the circumferential velocity of the rotary body reaches 800 m/sec or more, it is possible for the rotation of the rotary body to be maintained stably, and, for example, the amount of energy stored may be dramatically increased over the conventional by making the circumferential velocity of the rotary body 1800 m/sec, for example, which is close to the limit for the material strength of CFRP, that is, the tensile strength.

If this rotary body is used for the rotary body in an energy storage device, and external energy is applied to the rotary body to rotate it by an input means, the rotary body rotates in a state of extremely small frictional resistance, so once the rotation has begun, the state of rotation may be maintained for a long time. To put it another way, the external energy described above may be stored efficiently as energy of rotary motion. In addition, the energy of rotary motion stored in the rotary body during rotation may be extracted to the outside by an output means when necessary. The rotational force may be used as is, or may be converted to another form of energy, such as electricity, for use.

According to the present invention, it is possible to produce an electricity storage device with a large capacity in the 1000 kWh class, which is approximately 100 times the energy storage capacity of approximately 10 kWh, which is said to be the current limit, and which may be also used in load leveling.

(a) Since, according to the present invention, the required compressive force or compressive stress is applied in advance in the direction opposite to the direction of centrifugal force when the rotary body rotates, the strain due to the centrifugal force when a centrifugal force arises with rotation is reduced, equalized, or eliminated by compressive force or compressive stress, and the resistance to deformation may be improved.

By this means, it is difficult for the rotary balance of the rotary body to be broken down even with rotation of the rotary body at high speeds conventionally unavailable, and it is also difficult to increase the shaft vibration. Therefore, for example, even if the circumferential velocity of the rotary body reaches 800 m/sec or more, it is possible for the rotation of the rotary body to be maintained stably, and, for example, the amount of energy stored may be dramatically increased over the conventional by making the circumferential velocity of the rotary body 1800 m/sec, for example, which is close to the limit for the material strength of CFRP, that is, the tensile strength.

(b) A rotary body that has a structure elongated in the direction of centrifugal force when the rotary body is rotating has a so-called bar shape for the rotary body. Compared with conventional rotary bodies, which are disc-shaped flywheels or ring-shaped flywheels, the radius for the center of gravity of rotation for the rotary body may be made much larger for the same weight and the same angular speed of rotation, and the amount of energy stored may be increased remarkably. In addition, since the pulling direction during manufacture is along the same straight line, manufacture may be comparatively easy.

(c) When a plurality of rotary bodies is stacked in the direction of the line of the axis of rotation for the rotary bodies in the energy storage device, it can be comparatively easy to set the amount of energy that may be stored by using ones of the same shape, for example, and adjusting the number thereof.

DETAILED DESCRIPTION OF THE INVENTION

Figure 1:
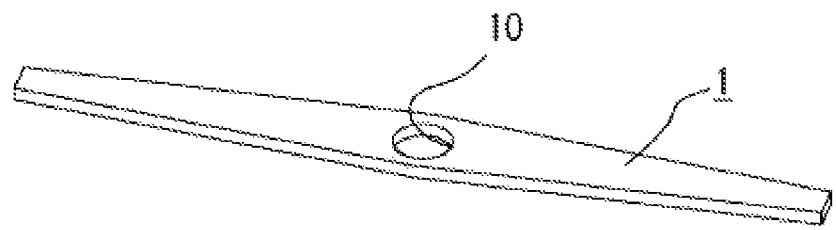
FIG. 1 is a perspective view of the structure of a rotary body according to the present invention.
Figure 2:
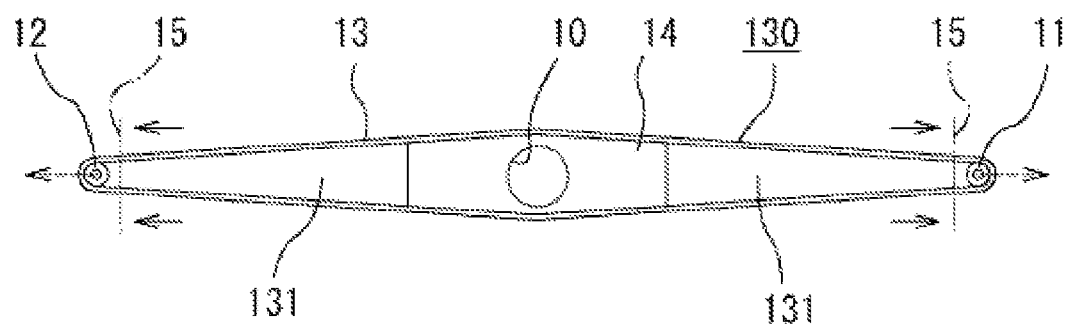
FIG. 2 is a plan view explanatory diagram showing the production method for the rotary body.

FIG. 1 shows the structure of a rotary body according to the present invention, and FIG. 2 is a plan view explanatory diagram showing a production method for the rotary body.

The rotary body 1 is manufactured as a solid from CFRP. The rotary body 1 has a long, thin plate shape or a bar shape. The rotary body 1 has an attachment hole 10 passing through from front to back for attaching a rotary shaft 102 that forms the center of rotation in the middle in the direction of length.

Moreover, the shape of the attachment hole 10 is a round hole in the present embodiment, but it may be another shape, for example, a square, hexagonal or other polygonal hole. In addition, it may be a hole with a bottom and not a through hole when used singly. Furthermore, the rotary shaft that forms the center of rotation may be directly attached to the rotary body.

When the rotary body 1 is used as the rotary body for an energy storage device A, it may be used singly or in a plurality (see FIG. 3, FIG. 4 and FIG. 5, which will be discussed in the following).

The manufacturing method for the rotary body 1 is as follows.

The description will be given with reference to FIG. 2.
(1) Two circular pieces of pulling hardware 11, 12, which are the pulling elements, are disposed with the required spacing.
(2) Ribbon-like bodies 13 made from carbon fibers are prepared, and the number of ribbon-like bodies 13 required is wrapped around the pulling hardware 11, 12.
(3) Center hardware 14 is disposed so as to be placed within the center part of the ribbon-like bodies 13, which are formed into a long, narrow ring shape. A round attachment hole 10 is provided as a through hole in the middle of the center hardware 14.
(4) The pulling hardware 11, 12 is moved so as to widen the space in between, and tensile force is applied to the ribbon-like body 13 in the direction of the arrows. This tensile force is essentially in the same direction as the centrifugal force during the rotation of the rotary body. In addition, the state where the tensile force is applied in the direction of the arrows to the ribbon-like bodies 13, which form a ring shape, forms a skeletal body 130.
(5) With the tensile force applied, plastic is made to flow into space parts 131, with the skeletal body 130 as the mold and hardened so as to contain the skeletal body 130. By releasing the tensile force from the pulling hardware 11, 12 after hardening, the required compressive stress is applied in advance to the rotary body 1 in the direction opposite to the direction of the centrifugal force when the rotary body 1 is rotated.
(6) Furthermore, the rotary body 1 is formed by suitably cutting both end parts at the lines of the cutting plane 15 so that the rotary body 1 is given rotary balance.

Figure 3:
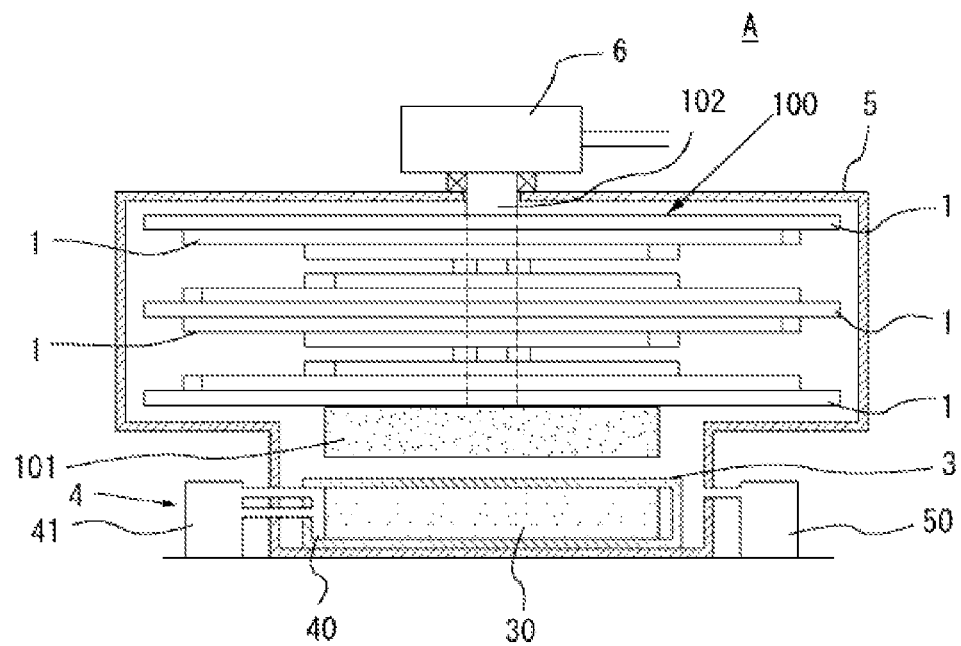
FIG. 3 is a cross-sectional diagram showing an embodiment of the energy storage device according to the present invention.
Figure 4:
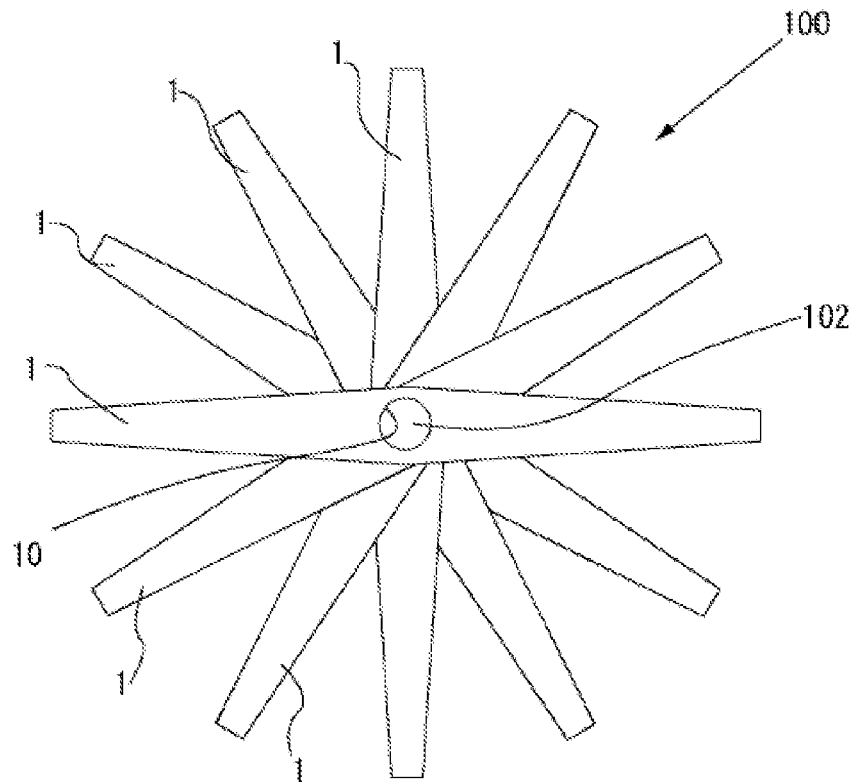
FIG. 4 is a plan view showing the structure of the rotary body assembly.

FIG. 3 is a cross-sectional diagram showing an embodiment of the energy storage device according to the present invention, and FIG. 4 is a plan view showing the structure of the rotary body assembly.

The energy storage device A is one having a structure where a weight (2) is replaced with a flywheel 100 in the energy storage device in the description for (FIG. 1) for the energy storage device described in Japanese Patent No. 2992578, which is already publicly known.

As is shown in FIG. 3, the energy storage device A is provided with a flywheel 100 with a plurality of rotary bodies 1 stacked and attached to a rotary shaft 102, a disc-shaped permanent magnet 101 affixed to the surface on the bottom part of the flywheel 100, an insulated vessel 3, a high-temperature oxide superconductor 30 provided inside the insulated vessel 3, liquid nitrogen 40 put into the insulated vessel 3, a liquid surface control device 41 that controls the surface of the liquid nitrogen in a constant manner, a liquid nitrogen cooling device 4, a vacuum tank 5 that accommodates the flywheel 100 and insulated vessel 3, a pressure reducing device 50 and an input/output device 6 having an electric motor (input part) and an electricity generating device (output part).

The high-temperature oxide superconductor 30 is disposed and affixed as a block in bulk (lump) form in the insulated vessel 3 which has the liquid nitrogen 40 in it, and it is in a superconductive state at the boiling point of the liquid nitrogen, 77 K (Kelvin), or lower.

As is shown in FIG. 4, the flywheel 100 in the vacuum tank 5 has 12 rotary bodies 1 stacked and attached so that the rotary shaft 102 is inserted into the attachment holes 10. The rotary shaft 102 passes through the top part of the vacuum tank 5 so that it is airtight and can rotate. The various rotary bodies 1 are affixed to the rotary shaft 102 in order with an offset of 30° each around the shaft by a fixation means (omitted from the drawing).

Moreover, in the present embodiment, the number of rotary bodies is 12, but there is no particular limit. In addition, the various rotary bodies 1 may be offset at equal angles as described above, but the offset angle may be changed for each one, and they may be arranged without being offset.

In addition, the disc-shaped permanent magnet 101 is affixed to the lower surface of the flywheel 100 as described above. The flywheel 100 is disposed on top of the insulated vessel 3, and when the high-temperature oxide superconductor 30 is in the superconductive state, the flywheel 100, to which the disc-shaped permanent magnet 101 is affixed, floats up from the upper surface of the insulated vessel 3, and may rotate in a state where there is no contact with the insulated vessel 3 centered on the rotary shaft (omitted from the drawing). Moreover, the gases inside this vacuum tank 5 are extracted to the outside by the pressure reducing device 50, and a high vacuum state is maintained. Attenuation of the rotary force of the flywheel 100 by the friction force of the gases is effectively prevented.

Since there is a concern that the liquid nitrogen 40 may gasify or the temperature rise because of the absorption of external heat, the liquid nitrogen cooling device 4 cools it to a prescribed temperature and, at the very least, maintains the inside of the insulated vessel 3 in a state where there is a fixed depth of the liquid phase. Therefore, the liquid surface control device 41 is provided linked to the insulated vessel 3. In other words, if the amount of liquid nitrogen 40 in the insulated vessel 3 drops and the surface of the liquid falls, this liquid surface control device 41 detects this and automatically supplies liquid nitrogen 42 to the inside of the insulated vessel 3 from the liquid nitrogen cooling device 4. The high-temperature oxide superconductor 30 is normally immersed in the liquid nitrogen 40 and the superconductive state is maintained.

The operation of the high-temperature oxide superconductor 30 used in the energy storage device A according to the present invention will be described herein.

If the high-temperature oxide superconductor 30 comes close to a permanent magnet or the like, the lines of magnetic force enter the high-temperature oxide superconductor 30, and are pinned and fixed as if pierced by a pin (called the fishing effect or pinning effect) by the impurity phase that is in the superconductive crystals.

By this means, the permanent magnet maintains its position. Furthermore, the lines of magnetic force, which are in this pinned state, conversely operate as a pinning force for the permanent magnet, and for example, when an operation where this permanent magnet applies a change to the lines of magnetic force in this high-temperature oxide superconductor 30 occurs, a preventative force operates on these. In other words, a repellent force operates when the permanent magnet comes closer and an attractive force operates when it gets further away.

Specifically, if the formation of a magnetic flux distribution in a concentric circle shape as with the disc-shaped permanent magnet 101 of this embodiment is used, there is no change in the magnetic flux distribution going through the high-temperature oxide superconductor 30 even if there is rotation centered on the rotary shaft 102, which is in the center of the disc-shaped permanent magnet 101, so resistive forces that prevent rotation or repellent forces and attractive forces that cause slippage and the like do not operate.

In other words, a rotational operation may be obtained with the center position of the disc-shaped permanent magnet 101 remaining as is in the pinned state, in other words, in a state where it is floated in a position without slippage, with enduring rotation possible, maintaining no contact and no resistance.

Therefore, after rotation of the flywheel 100 by the electric motor of the input/output device 6 by electric power supplied from the outside for a fixed period of time, the flywheel 100 and the disc-shaped permanent magnet 101 attached to this can maintain rotation over a long period of time if that electric power supply is stopped (may be carried out with mechanical switching such as a clutch device or the like) according to the energy storage device A according to the present embodiment, and the electric power described above may be stored as the energy of rotary motion.

In addition, with the rotary body 1 that is used in the energy storage device A, the required compressive stress is applied in advance in the direction opposite to the direction of centrifugal force when the rotary body 1 rotates, so the strain due to centrifugal force when a centrifugal force arises with rotation is reduced, equalized, or eliminated by the compressive stress, and the resistance to deformation can be improved.

By this means, it is difficult for the rotary balance of the flywheel 100, which is rotary bodies 1 and an aggregation thereof, to be broken down even with rotation of the flywheel 100 at high speeds conventionally unavailable, and it is also difficult to increase the shaft vibration. Therefore, for example, even if the circumferential velocity of the rotary body 1 reaches 800 m/sec or more, it is possible for the rotation of the rotary body 1 to be maintained stably, and, for example, the amount of energy stored may be increased over the conventional if the circumferential velocity is 1800 m/sec, for example, which is close to the limit for the material strength of CFRP, that is, the tensile strength.

In addition, since the rotary body 1 has a structure elongated in the direction of the centrifugal force when the rotary body 1 is rotating, that is, a so-called bar shape for the rotary body 1, the radius for the center of gravity of rotation for the rotary body may be made much larger for the same weight and the same angular speed of rotation than with conventional rotary bodies, which are disc-shaped flywheels or ring-shaped flywheels, and the amount of energy stored may be increased remarkably. In addition, since the pulling direction during manufacture is along the same straight line, manufacture may be comparatively easy.

Furthermore, since the number of rotary bodies 1 used for the flywheel 100 may be adjusted freely in a range that can be accommodated by the vacuum tank 5, the amount of energy that can be stored may be set comparatively easily.

In this case, the pressure inside the vacuum tank 5 was reduced to a high vacuum state by the pressure reduction device 50 described previously because of the frictional resistance with the gases in the air, and the frictional resistance caused by the air is reduced to the utmost. By this means, the electric power, which is the external energy, may be stored with high efficiency.

In addition, when electric power is necessary, the rotary movement energy may be converted into electrical energy by the electric power generating device that is combined with the electric motor in the input/output device 6.

In this case the amount of electric power stored E is determined substantially and unambiguously by the following calculation.

$$E = (1.3 \times 10^{-7}) \rho D^4 h R^2 \text{ (kWh)}$$

wherein:
  D: diameter (m) of the rotary body;
  h: height (m) of the rotary body;
  $\rho$: average density (g/cm$^3$) of the rotary body including the magnet;
  R: rotation (rpm) of the rotary body.

When, for example, D=5, h=4, $\rho$=5, R=3600, the amount of electricity stored is approximately $2.1 \times 10^4$ (kWh). In other words, substantially one day of electrical energy for an 877 kW generator may be stored with this device.

Moreover, in experiments, it was confirmed that this high-temperature oxide superconductor 30 has a lifting force of at least 2 kg/cm$^2$ at 77 K (Kelvin), and with this it is sufficiently possible to float the rotary shaft 102, flywheel 100 and disc-shaped permanent magnet 101 under the conditions described above. In addition, when the temperature of the high-temperature oxide superconductor 30 drops to approximately 60 K using the liquid nitrogen cooling device 4, there is a further dramatic improvement in the pinning force, and the lifting force improves approximately 2-10 fold.

Figure 5:
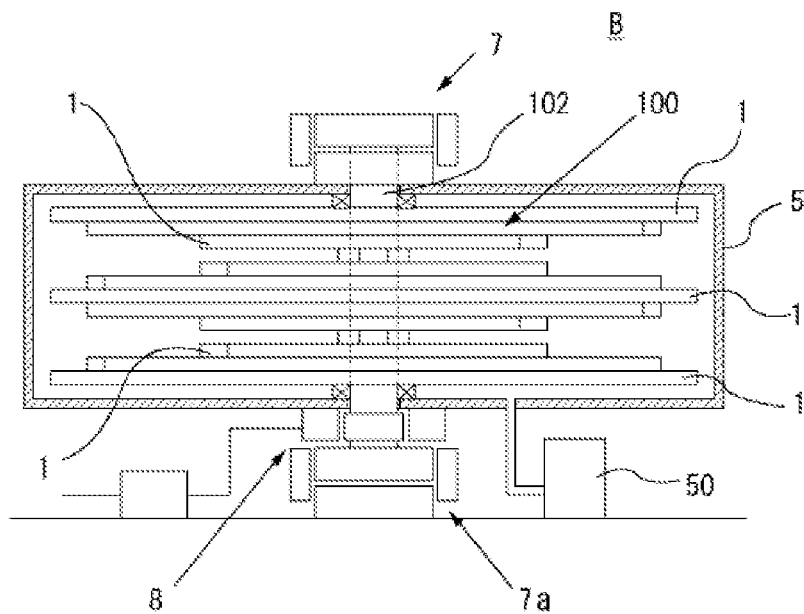
FIG. 5 is a cross-sectional diagram showing another embodiment of the energy storage device according to the present invention.

FIG. 5 is a cross-sectional diagram showing another embodiment of the energy storage device according to the present invention.

Moreover, in the present embodiment, the parts that are the same as the energy storage device A described above are shown by the same element numbers in the figures, and duplicative descriptions of the structure are basically omitted.

An energy storage device B takes the rotation of the flywheel 100 through superconductive radial bearings 7, 7a disposed in two places on the upper and lower sides of the vacuum tank 5. The rotary shaft 102 passes through the top part and bottom part of the vacuum tank 5 so that it is airtight and can rotate. In addition, the vacuum tank 5 is supported by a support means (omitted from the drawing).

The superconductive radial bearing 7 has the same structure as the resistance-free bearing structure using the high-temperature oxide superconductor 30 and the disc-shaped permanent magnet 101 of the energy storage device A described above. Moreover, the various accessory devices such as the insulated vessel, the liquid nitrogen cooling device, liquid surface control device and the like are omitted from the drawing.

In addition, a motor/generator 8 that constitutes the input/output device is provided above the superconductive radial bearing 7a on the lower side. Moreover, in the present embodiment, the motor/generator 8 is provided on the outside of the rotary shaft 102, but it may be made more compact through the use of a type that may be housed inside the rotary shaft 102.

Moreover, the operation of the flywheel 100 and the like, which are the aggregation of rotary bodies 1, is substantially the same as in the energy storage device A described above, so the description will be omitted.

(a) Since, according to the present invention, the required compressive force or compressive stress is applied in advance in the direction opposite to the direction of centrifugal force when the rotary body rotates, the strain due to the compressive force or compressive stress caused by the centrifugal force when a centrifugal force arises with rotation is reduced, equalized, or eliminated, and the resistance to deformation may be improved.

By this means, it is difficult for the rotary balance of the rotary body to be broken down even with rotation of the rotary body at high speeds conventionally unavailable, and it is also difficult to increase the shaft vibration. Therefore, for example, even if the circumferential velocity of the rotary body reaches 800 m/sec or more, it is possible for the rotation of the rotary body to be maintained stably, and, for example, the amount of energy stored may be dramatically increased over the conventional by making the circumferential velocity of the rotary body to be 1800 m/sec, for example, which is close to the limit for the material strength of CFRP, that is, the tensile strength.

(b) A rotary body that has a structure elongated in the direction of centrifugal force when the rotary body is rotating has a so-called bar shape for the rotary body. Compared with conventional rotary bodies, which are disc-shaped flywheels or ring-shaped flywheels, the radius for the center of gravity of rotation for the rotary body may be made much larger for the same weight and the same angular speed of rotation, and the amount of energy stored may be increased remarkably. In addition, since the pulling direction during manufacture is along the same straight line, manufacture may be comparatively easy.

(c) When a plurality of rotary bodies is stacked in the direction of the line of the axis of rotation for the rotary bodies in the energy storage device, it can be comparatively easy to set the amount of energy that may be stored by using ones of the same shape, for example, and adjusting the number thereof.

The invention claimed is:

1. A body used as a flywheel in an energy storage device that is capable of storing energy by rotating about an axis of rotation in a bearing part with a floating support using a fishing effect of superconductivity to reduce frictional resistance, the body comprising:

a plurality of rotary bodies stacked one on top of another along the axis of rotation of the body and fixed on a rotary shaft with an equal radial offset about the axis of rotation, each rotary body having an elongated plate shape in a direction of centrifugal force when the rotary body is rotating and including a center hardware having an attachment hole centrally disposed therein, the center hardware being centrally disposed in a skeletal body formed by wrapping a ribbon-like body of at least one of carbon fiber, glass fiber and high tensile strength fiber around pulling elements, wherein the rotary body is formed by filling space parts between the center hardware and skeletal body with plastic using the skeletal body as a mold, allowing the plastic to harden, removing the pulling elements and removing end parts to provide rotary balance, wherein a compressive stress is formed in each rotary body in a direction opposite to the direction of centrifugal force when the rotary body is rotating.

2. An energy storage device comprising:

a body according to claim 1, each rotary body being preformed with the compressive stress in the direction opposite to the direction of centrifugal force when the rotary body is rotating about the floating support using the fishing effect of superconductors, a vacuum tank capable of accommodating said body and maintaining a high vacuum state, an input device of external energy to be stored as the energy of rotary motion that provides external energy to said body and rotates it, and an output device capable of extracting the energy of rotary motion of said body to the outside.

3. An energy storage device comprising:

an insulated vessel accommodating a superconductor capable of restricting and holding lines of magnetic force that penetrate internally and generating a fishing effect, a cooling device that cools a coolant for maintaining the inside of said insulated vessel at a critical temperature for said superconductor or lower, a body according to claim 1, each rotary body being preformed with the compressive stress in the direction opposite to the direction of centrifugal force when the rotary body is rotating, the body having a magnet that generates the fishing effect along with said superconductor, a vacuum tank accommodating said insulated vessel, and accommodates said body such that said body rotates freely and is capable of maintaining a high vacuum state inside using a pressure reducing device, and an input/output device providing a rotary force using external energy to the body in said vacuum tank, giving the body rotary motion in a low frictional resistance state and storing the external energy as that energy of rotary motion as well as extracting that energy of rotary motion to the outside.

* * * * *